(12) United States Patent
Aiello et al.

(10) Patent No.: US 7,134,792 B2
(45) Date of Patent: Nov. 14, 2006

(54) SINGLE THRUST-JOURNAL BEARING CUP FLUID DYNAMIC BEARING MOTOR

(75) Inventors: Anthony Joseph Aiello, Aptos, CA (US); Klaus Dieter Kloeppel, Watsonville, CA (US); Paco Gregor Flores, Felton, CA (US); Alex Gredinberg, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 102 days.

(21) Appl. No.: 10/702,793

(22) Filed: Nov. 5, 2003

(65) Prior Publication Data
US 2004/0091187 A1     May 13, 2004

Related U.S. Application Data

(60) Provisional application No. 60/424,217, filed on Nov. 5, 2002.

(51) Int. Cl.
*F16C 17/10*    (2006.01)
(52) U.S. Cl. .................................................. 384/107
(58) Field of Classification Search ............... 384/107, 384/112, 113, 123, 124
See application file for complete search history.

(56) References Cited

U.S. PATENT DOCUMENTS

| 5,423,612 A | 6/1995 | Zang et al. ................... 384/119 |
| 6,154,339 A | 11/2000 | Grantz et al. ............ 360/99.08 |
| 6,834,996 B1 * | 12/2004 | Gomyo et al. ............... 384/100 |
| 2003/0108257 A1 * | 6/2003 | Gomyo ........................ 384/114 |

* cited by examiner

*Primary Examiner*—Lenard A. Footland
(74) *Attorney, Agent, or Firm*—Morrison & Foerster LLP (57) ABSTRACT

A fluid dynamic bearing motor is described. In one embodiment, the fluid dynamic bearing motor includes a stationary member and a rotating member. The motor further includes a fluid dynamic thrust bearing disposed along an axial surface of a sleeve. The thrust bearing is configured to axially support the relative rotation of the rotating member and the stationary member and to pump bearing fluid towards a corner of the sleeve. The motor also includes a fluid dynamic journal bearing disposed radially inboard of the thrust bearing along a radial surface of the sleeve, where the radial surface is adjacent to the axial surface. The journal bearing is configured to radially support the relative rotation of the rotating member and the stationary member and to pump bearing fluid to the corner of the sleeve.

20 Claims, 7 Drawing Sheets

SINGLE THRUST-JOURNAL BEARING CUP FLUID DYNAMIC BEARING MOTOR

CROSS REFERENCE TO RELATED APPLICATIONS

This application claims the priority of U.S. Provisional Application Ser. No. 60/424,217, filed Nov. 5, 2002 by Aiello (entitled "Single Thrust-Journal Bearing Cup FDB Motor"), which is herein incorporated by reference.

FIELD OF THE INVENTION

The present invention relates generally to fluid dynamic bearing motors, and relates more specifically to fluid dynamic bearing motors having grooved bearing surfaces.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks.

From the foregoing discussion, it can be seen that the bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. The relatively rotating members may comprise bearing surfaces such as cones or spheres and comprise hydrodynamic grooves formed on the members themselves. Fluid dynamic bearings spread the bearing surface over a large surface area, as opposed to a ball bearing assembly, which comprises a series of point interfaces. This bearing surface distribution is desirable because the increased bearing surface reduces wobble or run-out between the rotating and fixed members. Further, the use of fluid in the interface area imparts damping effects to the bearing, which helps to reduce non-repeatable run-out. Thus, fluid dynamic bearings are an advantageous bearing system.

Many current fluid dynamic bearing motor designs used in small form factor drives—that is, drives with stringent axial height constraints—suffer from insufficient angular stiffness due to the limited height/axial space available for journal bearing span. For example, conventional "single plate" fluid dynamic bearing motors are characterized by a journal bearing located on a shaft surface adjacent to a plate upon which two axial thrust bearings are formed. Since there are no features on the outer circumference of this thrust plate, its thickness (i.e., axial height) is essentially wasted space in the overall height budget of the motor. Similarly, vertically "stacking" the journal bearing and thrust plate results in a relatively tall bearing, which is difficult to fit in a small form factor motor while maintaining effective performance.

Further, it is well known in the art that angular stiffness is a function of the axial stiffness in a thrust bearing times a moment arm length (i.e., the thrust bearing diameter). However, as large diameter thrust bearings consume relatively more power, fluid dynamic bearing motor designs using large diameter thrust bearings to increase angular stiffness have been found to consume too much power to work effectively in small disc drives.

Thus, there is a need in the art for a fluid dynamic bearing design for small form factor disc drives that employs a large diameter thrust bearing that increases angular stiffness without consuming an impractical amount of power and a short journal bearing that conserves axial space.

SUMMARY OF THE INVENTION

In one embodiment, a fluid dynamic bearing of very low profile is achieved by locating a single radial journal bearing and one axial thrust bearing onto a single sleeve attached to the upper end of a supporting stationary part of a fluid dynamic bearing motor. The sleeve's inner diameter journal grooves provide radial and angular stiffness, and the axial thrust grooves provide axial and angular stiffness. This type of bearing can be applied to both stationary and rotating shaft style motor designs. The journal bearing can be significantly shorter than a traditional shaft-based journal since it is aligned with the rotor's center of gravity for optimal effectiveness. The height of the bearing is now limited to the sleeve thickness plus the seal height, and no longer includes the additional height associated with a traditional shaft-based journal associated with "single-plate" FDB designs.

In an alternative embodiment, a sleeve is supported from a central stationary support. A rotating shaft and hub are supported by a journal bearing interior to the sleeve and a thrust bearing between the sleeve and hub. A separate limiter that is attached to the hub includes a shoulder cooperating with the stationary support to limit shock displacement. Magnetic bias force is also usually provided to cooperate with the single thrust bearing. To maintain fluid, a central vent through the rotating shaft is provided; capillary seals on opposite sides of the sleeve, and a recirculation channel through the sleeve are also provided. In another approach, the vent is deleted and only a single seal is needed.

In a further alternative embodiment, the sleeve is integrated into the rotating hub rather than the stationary support. A circulation path may be provided in part by a recirculation channel in the stationary part; however other hole, notch or slot configurations would also be effective. A single seal is used with a close-ended design since there is no secondary vent.

In another alternative embodiment, an additional shaft part extends upward through an enlarged hole to attach to the top cover. The capillary seals are oriented nearly parallel to the motor axis, but with a slight angle such to introduce a centrifugal oil retention force during rotation. The shaft is preferably attached to the top cover by a screw, although various other means can be employed.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
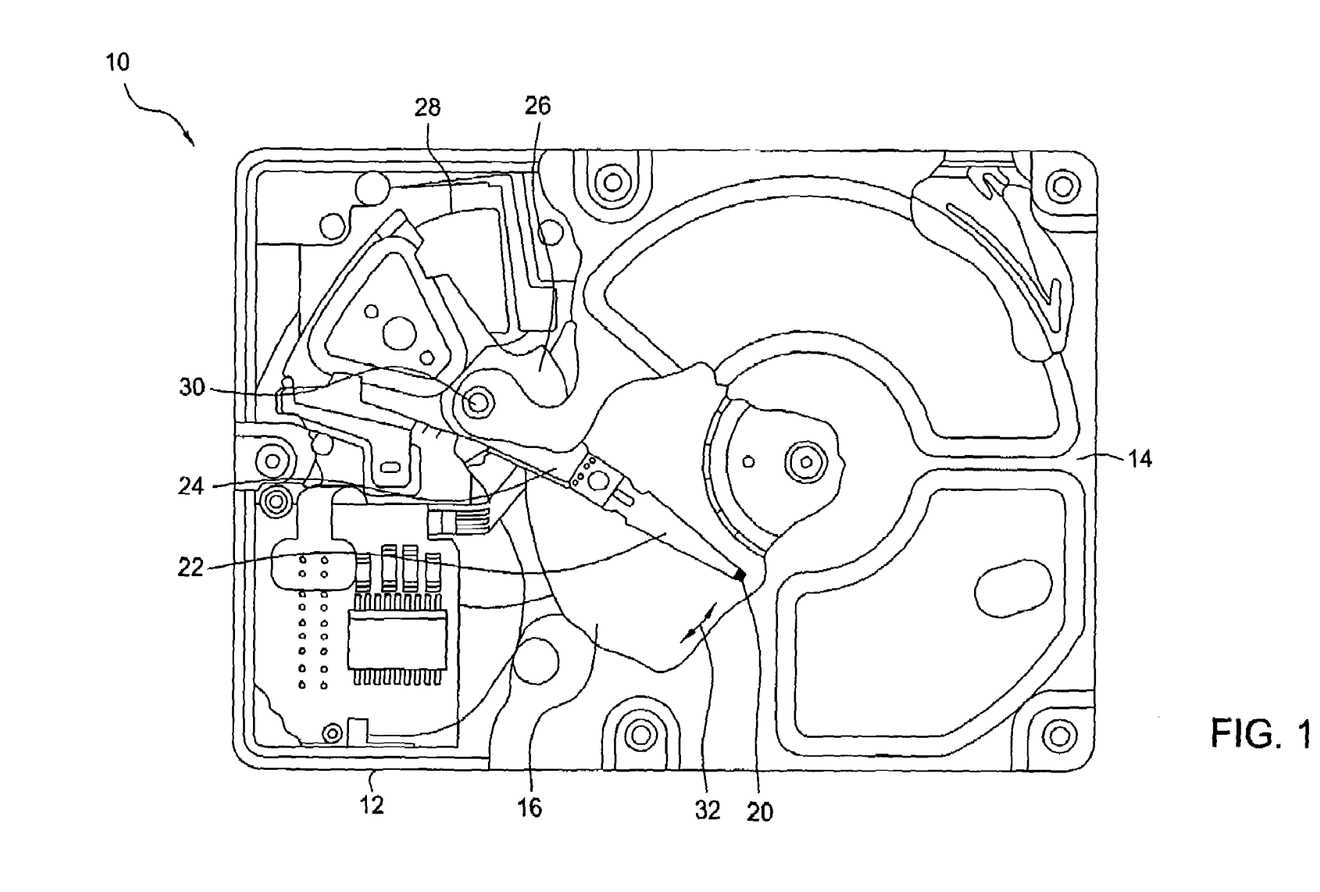
FIG. 1 depicts a plan view of one embodiment of a disk drive that comprises a motor in which the invention is used.

FIG. 1 depicts a plan view of one embodiment of a disk drive 10 for use with embodiments of the invention. Referring to FIG. 1, the disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing.

Disk drive 10 further includes a disk pack 16 that is mounted on a hub 202 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor, shown generally at 28. Voice coil motor 28 rotates actuator 26 with its attached read/write heads 20 about a pivot shaft 30 to position read/write heads 20 over a desired data track along a path 32.

Figure 2:
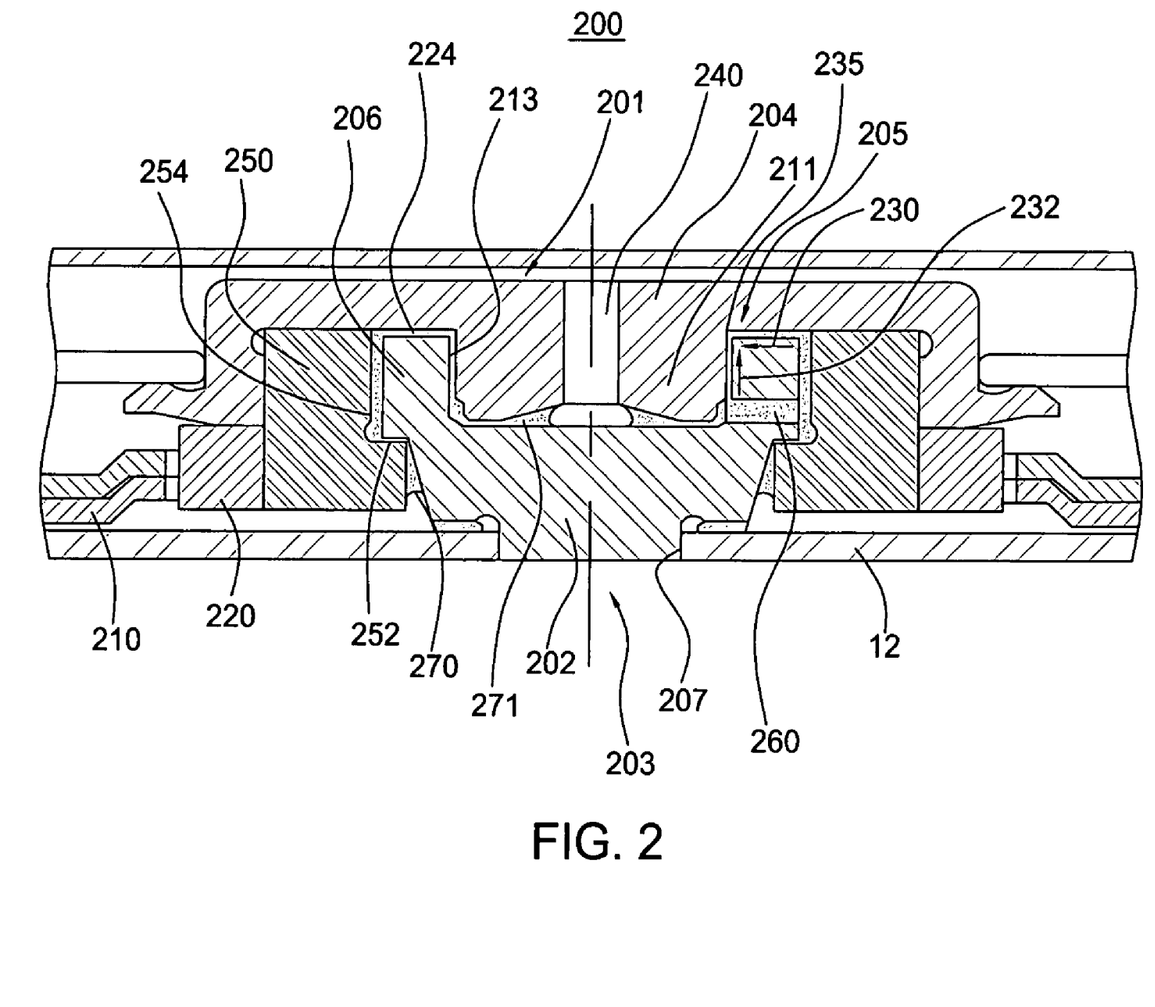
FIG. 2 depicts a side sectional view of a fluid dynamic bearing motor in which an embodiment of the present invention is employed.

FIG. 2 illustrates a vertical sectional view of a fluid dynamic bearing motor 200 including a stationary support 202 mounted at a first end 207 to a base 12. The stationary support 202 may be, for example, screwed or pressed or otherwise fastened into place. A sleeve 206 is integrally formed with or otherwise supported from the support 202 and extends axially from the base 12. This arrangement forms a stationary part with a "cup" shaped region that defines a space within the inner circumference 213 of the sleeve 206. The rotating assembly 201 comprises a hub 204 rotatably supported by the fluid bearings (explained below) above the sleeve 206. A cylindrical portion or shaft 211 of the hub 204 extends downward and is surrounded by the sleeve 206 (i.e., fits within the "cup" of the stationary part). A limiter 250 is attached to the hub 204. A magnet 220 is mounted to the limiter 250; preferably the magnet 220 is axially offset from a stator 210. The stator 210 and the magnet 220 cooperate to rotate the hub 204; the axial offset helps maintain the alignment of the hub 204 and the sleeve 206. The limiter 250 includes a shoulder 252 extending beneath the sleeve 206 to limit shock displacement of hub 204.

The fluid-bearing assembly 205 that supports rotation of the hub 204 includes a fluid-filled gap 224 defined by the facing surfaces of the inner axial surface of the hub 204, the outer diameter of the shaft 211 and the inner diameter of the limiter 250 and the facing surfaces of the sleeve 206 and the stationary support 202. The gap regions marked by arrows 230, 232 have grooves on one of the two facing surfaces that define the gap, the grooves being defined to pump in the direction of the arrows toward the common corner 235, so that effective journal 232 and thrust 230 bearings are formed to support rotation of the hub 204 and the shaft 211 over support 202. The fluid-filled gap 224 continues between the outer radial surface 252 of the sleeve 206 and the facing surface 254 of limiter 250. Capillary seals 270, 271 defined by the diverging surfaces of the support 202 and the limiter 250 and the shaft 211, respectively, cooperate with the radially directed recirculation channel 260. When configured properly, the capillary seals 270, 271 and the recirculation channel 260 interact with centrifugal forces to purge air from the bearing fluid through either or both of the capillary seals 270, 271. The capillary seals 270, 271 also act as bearing fluid reservoirs. For example, air from the capillary seal 271, oriented between the shaft 211 and the stationary support 202, is purged through a vent hole 240 disposed through the cylindrical shaft 211 of the hub 204. The capillary seal 271 is thus in communication with ambient pressure via the vent hole 240 enabling the air purging. Persons skilled in the art will understand that this air purging functionality usually is relevant only in embodiments where the bearing fluid comprises a liquid.

Figure 3:
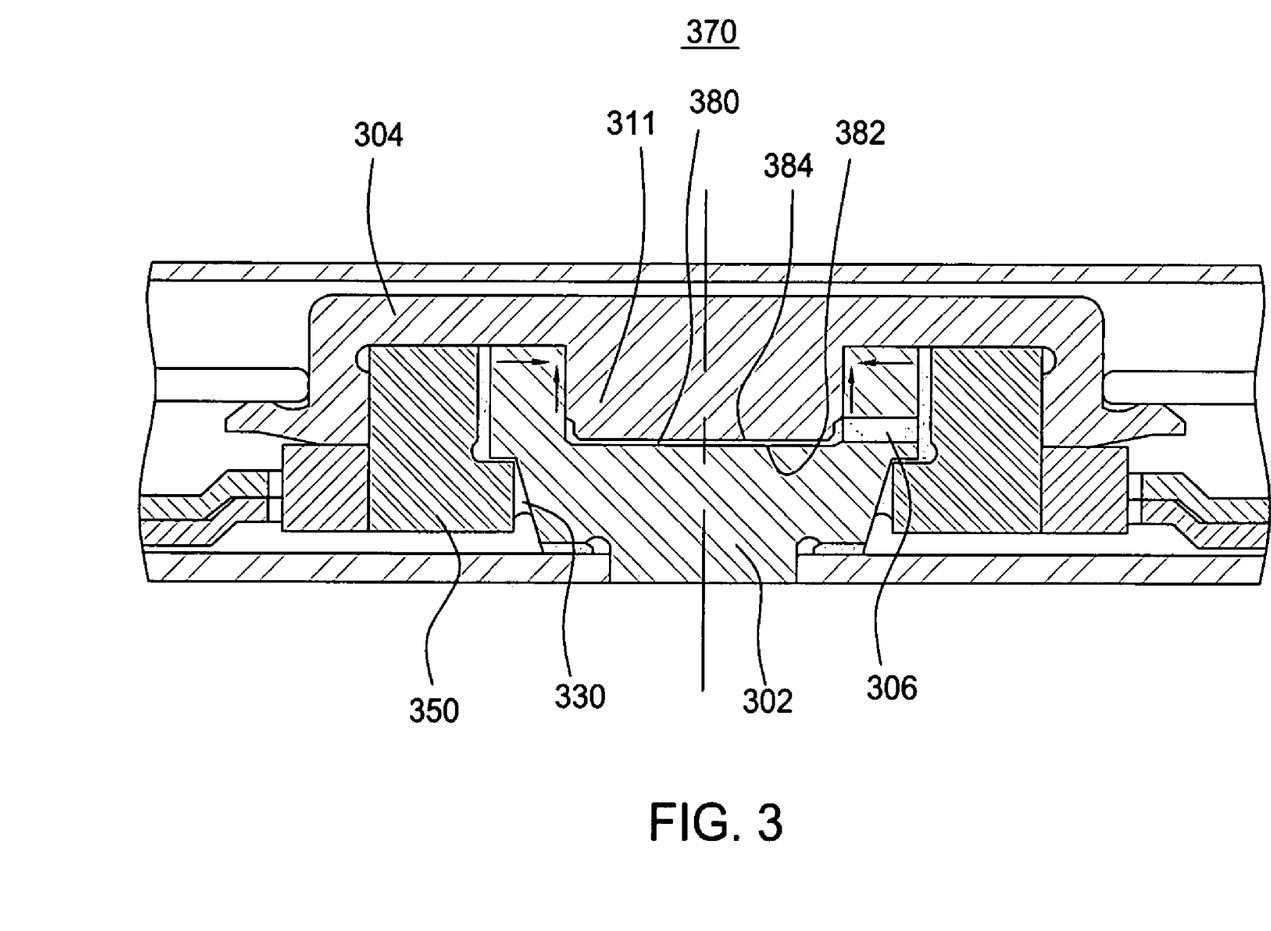
FIG. 3 depicts a side sectional view of an alternative embodiment of the present invention.

Alternatively, the motor may be configured similarly but remain "unvented," as in FIG. 3. That is, the bearing design disclosed in this figure may be used in a motor 370 having no vent hole through the hub 304, and only one capillary seal 330 oriented as the seal 270 is in the motor 200 (i.e., between the support 302 and the limiter 350). The design of FIG. 3 is otherwise similar to FIG. 2, except that further simplicity is achieved by defining a continuous gap 380 between an upper surface 382 of stationary support 302 and a lower surface 384 of shaft 311, which is integrated with hub 304. Therefore, only the single capillary seal 330 is needed to maintain fluid in the bearing gap.

Figure 4:
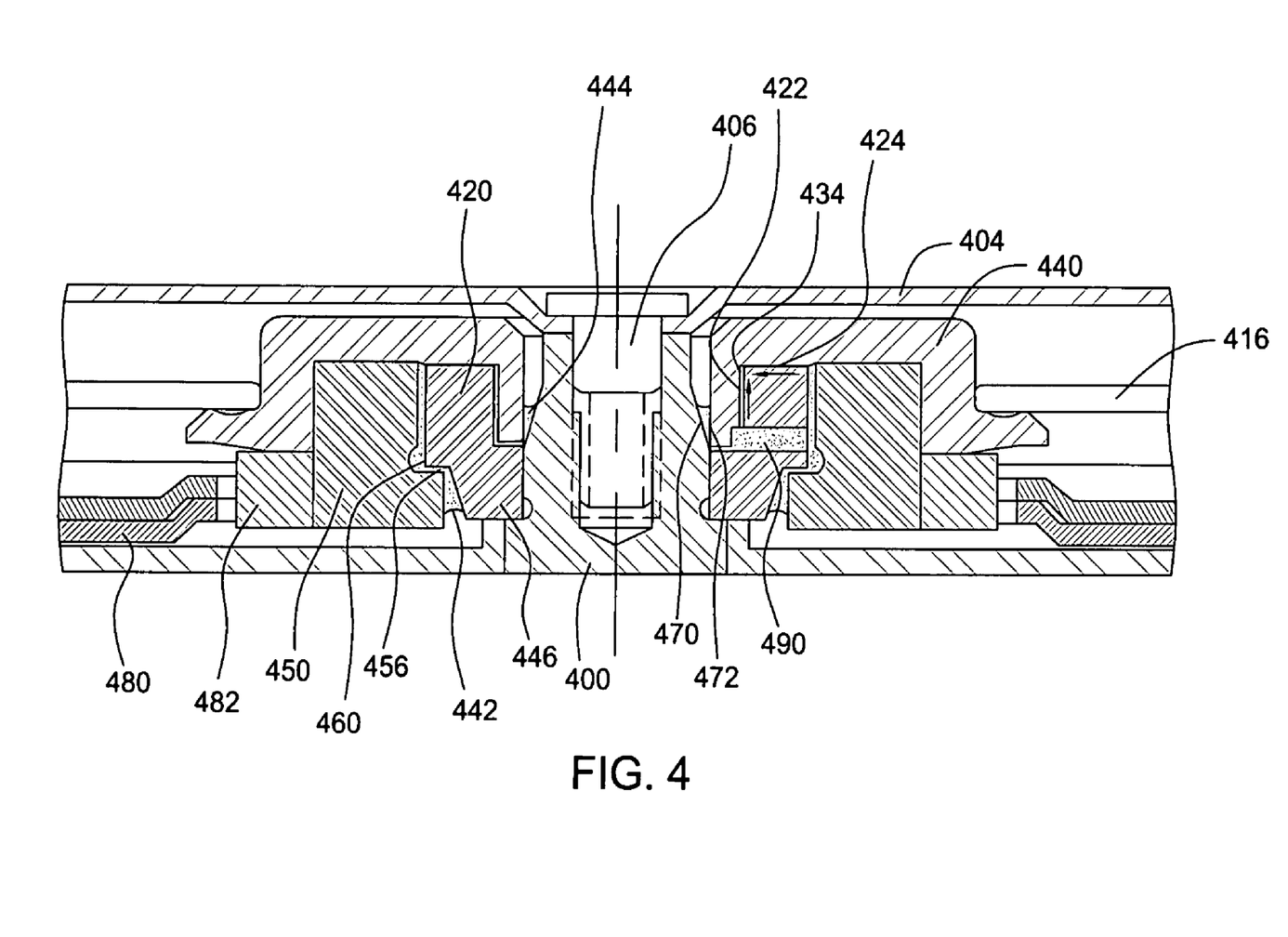
FIG. 4 depicts a side sectional view of another alternative embodiment of the present invention.

Yet another approach is shown in FIG. 4 utilizing a fixed shaft 400, which extends upward through the center of hub 440 and may be attached to a top cover 404 by a typical attachment device 406. The sleeve 420 is supported from fixed shaft 400 and includes grooved regions 422, 424 with the grooves being oriented to pump toward the common corner 434. Such a configuration provides the support necessary for the hub 440 with one or more discs 416 to maintain a constant speed rotation. As in other designs, the gap surrounding three sides of the sleeve 420 ends at one end in capillary seal 442, defined between diverging surfaces of the limiter 450 and the section 446 of the sleeve 420. At the opposite end of the gap, the surfaces 470, 472 of the shaft 400 and the hub 440, respectively, diverge to form capillary seal 444 and to introduce a centrifugal oil retention force during rotation.

To maintain axial alignment of the shaft 400 and hub 440, the stator 480 is offset from the magnet 482 to produce an axial bias force. The limiter 450, which is attached to hub 440, includes a shoulder 456, which extends beneath a corner 460 of the sleeve 420 to limit axial displacement.

Also, a generally radially extending recirculation channel 490 is provided in between the two capillary seals 442, 444 to provide for fluid circulation and elimination of bubbles in the fluid, as described above.

Figure 5:
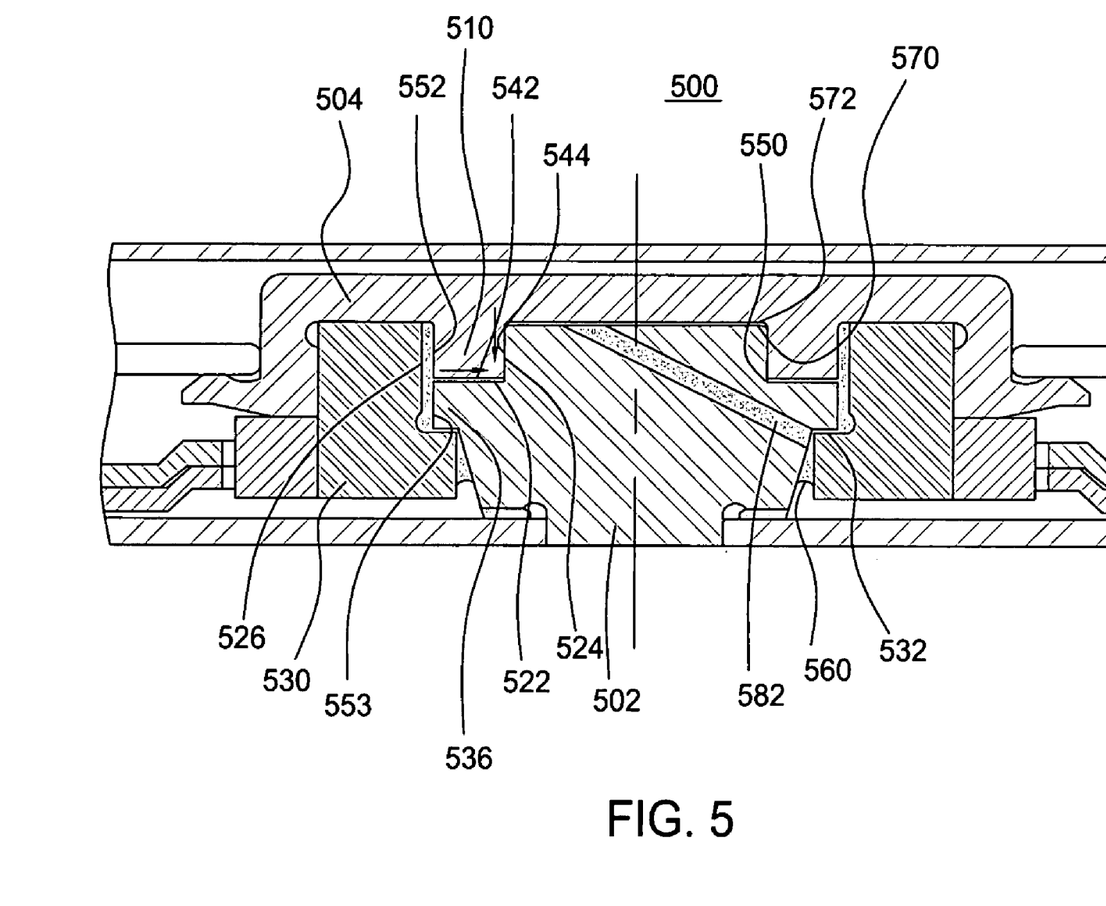
FIG. 5 depicts a side sectional view of another alternate embodiment of the present invention.

In FIG. 5, a further alternative is disclosed in which motor 500 includes a sleeve 510 integrated into the rotating hub 504, which rotates over and around the stationary support shaft 502. In this design, the sleeve 510 extends into a recess defined by adjacent surfaces 522, 524 of the stationary shaft 502 and a surface 526 of the limiter 530, which is supported from and rotates with the hub 504. As in previous designs, the limiter 530 includes a shoulder 532, which extends radially beneath a flange 536 of the shaft 502 to limit axial displacement between the rotating limiter 530 and hub 504 and the stationary shaft 502.

The surfaces 522, 524 of the shaft 502 or the facing surfaces 542, 544 of the sleeve 510 are grooved, with the grooves being configured to pump bearing fluid that is present in the gap between the facing surfaces toward the common corner 550. As is known, the gap continues and extends between all the relatively rotating surfaces; the fluid extends into a gap between the surface 526 of limiter 530 and the facing surfaces 552 of shaft 502 and 553 of flange 536; and further extends between the limiter 530 and the shoulder 532 and the facing surfaces of the flange 536 and the shaft 502, ending in a capillary seal 560, which is defined by the facing surfaces of the shaft 502 and the limiter 530, at least one of which is angled relative to the other.

The fluid gap further extends over the axially facing surfaces 570, 572 of the shaft 502 and the hub 504, respectively, to support relative rotation. Finally, a circulation path is provided by a recirculation channel 582, which extends from the gap between the shaft 502 and the hub 504 angularly downward to where the gap is defined on the opposite side of the shaft 502 facing the limiter 530, but interior to the single capillary seal 560; of course, other hole notch or slot configurations would be equally effective to provide the necessary fluid recirculation which provides for the exit of air bubbles from the fluid stream and enforces desirable pressure boundary conditions.

Figure 6A:
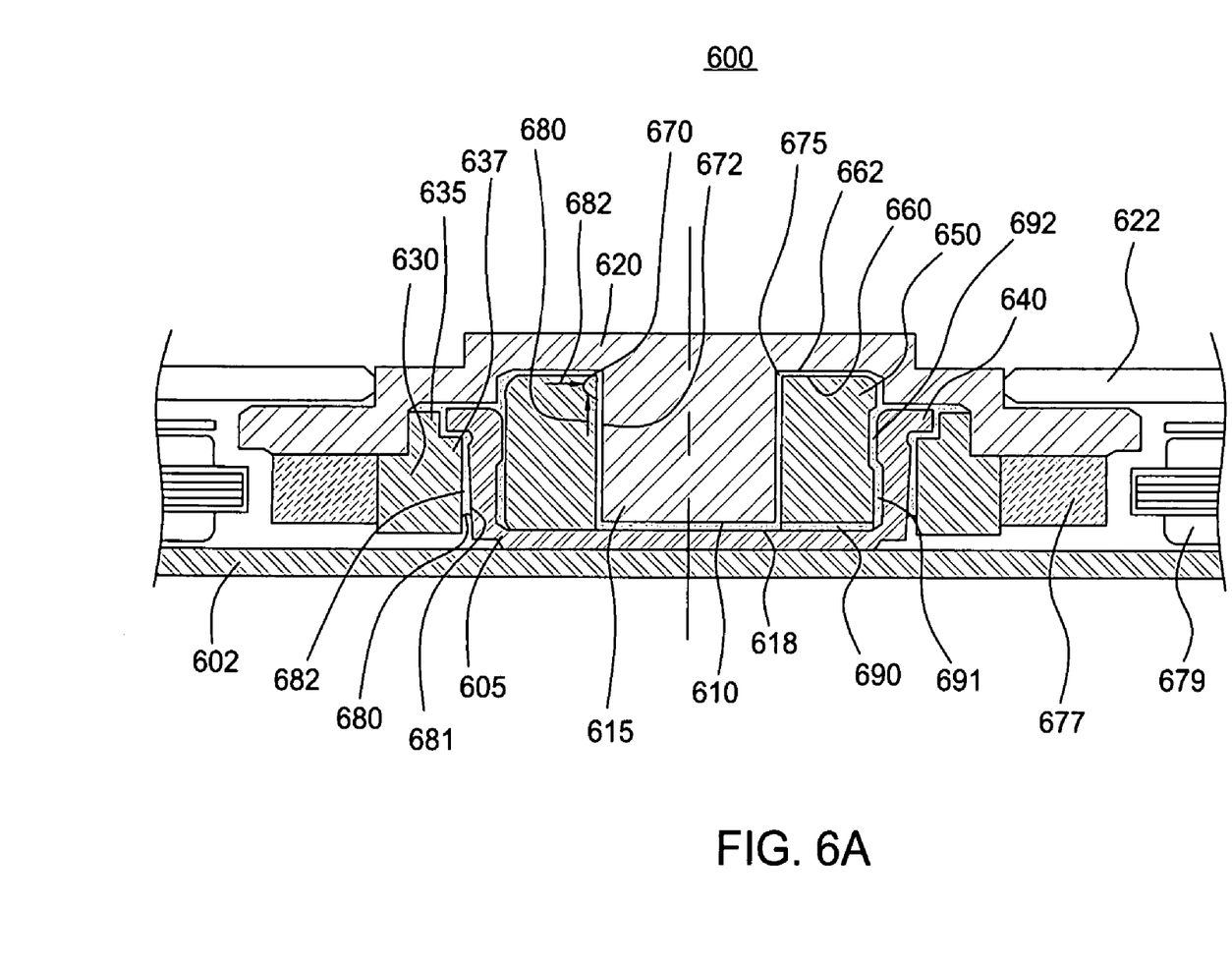
FIGS. 6A and 6B depict side sectional views of yet another alternate embodiment of the present invention.
Figure 6B:
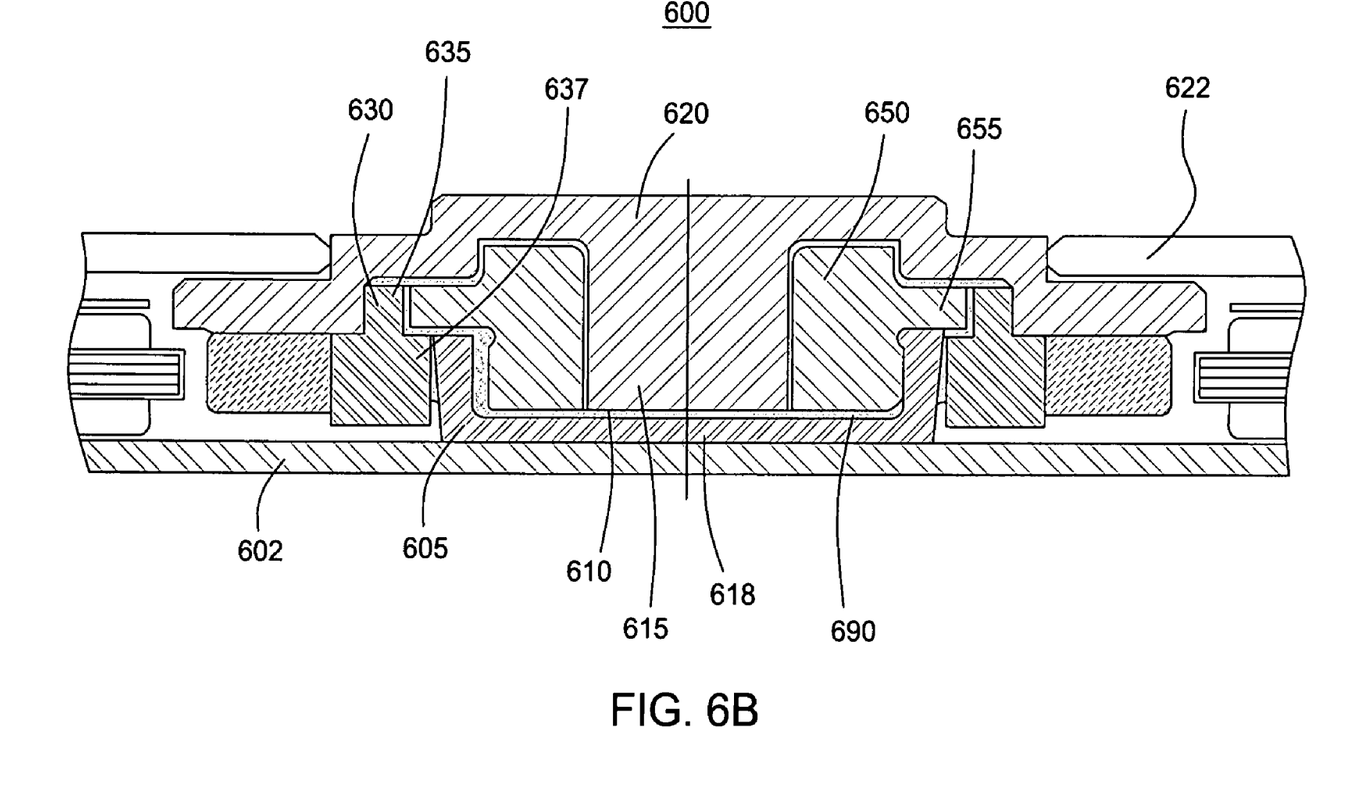

FIGS. 6A and 6B illustrate the application of the principles described above to a spindle motor 600 supported on a base 602. A cover plate 605 supports the motor over the base 602 and provides a fluid surface between the bottom surface 610 of the shaft 615 and the facing surface 618 of the cover plate 605. The embodiments further have in common a single-piece hub 620 shown integrated with the shaft 615 and supporting a disc 622 for rotation on an outer end thereof. However, this feature is not necessarily important to the present construction and the hub 620 and shaft 615 could be pieces which are formed separately and integrated or joined to rotate together in any known manner.

Each of the designs further includes a limiter 630, which is attached to the hub 620 at an upper region 635 and includes a shoulder 637, which underlies a flange of a stationary element of the design in order to limit axial displacement. It is at this point that the embodiments of FIGS. 6A and 6B diverge.

The embodiment of FIG. 6A includes a flange 640, disposed at the upper end of the cup-shaped cover plate 605 and extending radially outward to interact with the shoulder 637 of the limiter 630, thereby limiting displacement while affording relatively easy and straight forward assembly. Alternatively, in the design shown in FIG. 6B, the sleeve 650 includes a flange 655, which extends both over an end of the cover plate 605 and over the shoulder 637 of the limiter 630. So again axial displacement is limited.

In a feature which characterizes the preceding embodiments, one of the axial surfaces 660, 662 between the hub 620 and sleeve 650 and one of the radial facing surfaces 670, 672 of the sleeve 650 and shaft 615 comprise grooves that are designed to pump (as represented by arrows 680, 682) towards the corner 675. In this way, the journal grooves provide the necessary radial stiffness and the axial grooves provide the axial and angular stiffness. As persons skilled in the art will understand, such an approach allows the journal bearing to be substantially shorter than a traditional journal, as the bearings and the corner toward which they pump are substantially aligned with the center of gravity of the rotating disc.

Grooves may also be defined on one of the end of the shaft 615 or the facing surface of the cover plate 605; typically also the magnet 677 will be offset from the stator 679 to provide an axial bias force that maintains the alignment of the overall system. As is known in the field, the fluid gaps must be defined between the relatively rotating surfaces of the design, and end in a single capillary seal 680 defined between the relatively diverging surfaces 681, 682 of the cover plate 605 and limiter 630, respectively. Bearing fluid is maintained between the cover plate 605 and the limiter 630 to support relative rotation thereof. Fluid channels 690, 691 and 692 between the cover plate 605 and sleeve 650 are provided to allow for the necessary circulation to eliminate air bubbles and enforce desirable pressure boundary conditions. Other features and advantages of this invention will be apparent to a person of skill in the art who studies the above invention disclosure whose scope is to be limited only by the following claims.

What is claimed is:

1. A fluid dynamic bearing motor, comprising:
   a stationary member; a rotating member;
   a fluid dynamic thrust bearing disposed along an axial surface of a sleeve, the thrust bearing configured to axially support the relative rotation of the rotating member and to pump bearing fluid towards a corner of the sleeve;
   a fluid dynamic journal bearing disposed radially inboard of the thrust bearing along a radial surface of the sleeve, the radial surface being adjacent to the axial surface, the journal bearing configured to radially support the relative rotation of the rotating member and to pump bearing fluid towards the corner of the sleeve; and
   a recirculation channel, wherein the recirculation channel is fluidly coupled to at least one capillary seal, and one of either the journal bearing or the thrust bearing is configured with a relatively stronger asymmetry to induce bearing fluid recirculation.

2. The fluid dynamic bearing motor oil of claim 1, further comprising a limiter attached to the rotating member and configured to limit axial displacement of the rotating member.

3. The fluid dynamic bearing motor of claim 2, wherein the limiter includes a shoulder that extends radially beneath the sleeve to limit axial displacement of the rotating member.

4. The fluid dynamic bearing motor of claim 2, wherein the limiter includes a shoulder that extends radially beneath a flange of the sleeve to limit axial displacement of the rotating member.

5. The fluid dynamic bearing motor of claim 2, wherein the limiter includes a shoulder that extends radially beneath a flange of the stationary member to limit axial displacement of the rotating member.

6. The fluid dynamic bearing motor of claim 1, wherein the recirculation channel extends through the sleeve.

7. The fluid dynamic bearing motor of claim 6, wherein the recirculation channel is configured such that the induced circulation and centrifugal forces purge air from the bearing fluid through the at least one capillary seal.

8. The fluid dynamic bearing motor of claim 7, further comprising a vent hole extending axially through the rotating member and coupled to the at least one capillary seal to facilitate air purging.

9. The fluid dynamic bearing motor of claim 1, further comprising a recirculation channel extending from interior to the journal bearing and the thrust bearing, through the stationary member, to exterior of the journal bearing and the thrust bearing.

10. The fluid dynamic bearing motor of claim 9, wherein the recirculation channel is fluidly coupled to a capillary seal, and one of either the journal bearing or the thrust bearing is configured with a relatively stronger asymmetry to induce bearing fluid recirculation such that the induced circulation and centrifugal forces purge air from the bearing fluid through the capillary seal.

11. The fluid dynamic bearing motor of claim 1, further comprising one or more fluid channels disposed between the stationary member and the sleeve, wherein the one or more fluid channels are fluidly coupled to a capillary seal, and one of either the journal bearing or the thrust bearing is configured with a relatively stronger asymmetry to induce bearing fluid recirculation such that the induced circulation and centrifugal forces purge air from the bearing fluid through the capillary seal.

12. The fluid dynamic bearing motor of claim 1, further comprising a limiter attached to the rotating member, a magnet attached to the limiter and a stator, the limiter and the stator being axially offset to produce a downward acting axial bias force on the rotating member.

13. A fluid dynamic bearing motor, comprising:
a stationary member;
a hub configured to rotate relative to the stationary member and to support one or more discs;
a sleeve coupled to the stationary member;
a fluid dynamic thrust bearing disposed along an axial surface of the sleeve, the thrust bearing configured to axially support the relative rotation of the hub and to pump bearing fluid towards the corner of the sleeve;
a fluid dynamic journal bearing disposed radially inboard of the thrust bearing along a radial surface of the sleeve, the radial surface being adjacent to the axial surface, the journal bearing configured to radially support the relative rotation of the hub and to pump bearing fluid towards the corner of the sleeve; and
a recirculation channel, wherein the recirculation channel is fluidly coupled to at least one capillary seal, and one of either the journal bearing or the thrust bearing is configured with a relatively stronger asymmetry to induce bearing fluid recirculation.

14. The fluid dynamic bearing motor of claim 13, further comprising a limiter attached to the hub, the limiter configured to limit axial displacement of the hub, a magnet attached to the limiter and a stator, the magnet and the stator being axially offset to produce a downward acting axial bias force on the hub.

15. The fluid dynamic bearing motor of claim 14, wherein the recirculation channel extends radially through the sleeve, and further wherein the recirculation channel is fluidly configured such that the induced circulation and centrifugal forces purge air from the bearing fluid through the at least one capillary seal.

16. The fluid dynamic bearing motor of claim 15, wherein the stationary member comprises a shaft, the shaft including an axially extending vent hole and being attachable to a top cover.

17. The fluid dynamic bearing motor of claim 14, further comprising one or more fluid channels disposed between the stationary member and the sleeve, wherein the one or more fluid channels are fluidly coupled to a capillary seal, and one of either the journal bearing or the thrust bearing is configured with a relatively stronger asymmetry to induce bearing fluid recirculation such that the induced circulation and centrifugal forces purge air from the bearing fluid through the capillary seat.

18. A fluid dynamic bearing motor, comprising:
a stationary member;
a hub configured to rotate relative to the stationary member and to support one or more discs;
a sleeve coupled to the hub;
a fluid dynamic thrust bearing disposed along an axial surface of the sleeve, the thrust bearing configured to axially support the relative rotation of the hub and to pump bearing fluid towards a corner of the sleeve;
a fluid dynamic journal bearing disposed radially inboard of the thrust bearing along a radial surface of the sleeve, the redial surface being adjacent to the axial surface, the journal bearing configured to radially support the relative rotation of the hub and to pump bearing fluid towards the corner of the sleeve; and
a recirculation channel fluidly coupled to a capillary seal, wherein one of either the journal bearing or the thrust bearing is configured with a relatively stronger asymmetry to induce bearing fluid recirculation.

19. The fluid dynamic bearing motor of claim 18, further comprising a limiter attached to the hub, the limiter including a shoulder that extends radially beneath a flange of the stationary member to limit axial displacement of the hub, a magnet attached to the limiter and a stator, the magnet and the stator being axially offset to produce a downward acting axial bias force on the hub.

20. The fluid dynamic bearing motor of claim 19, wherein the recirculation channel extends from interior to the journal bearing and the thrust bearing, through the stationary member, to exterior of the journal bearing and the thrust bearing, wherein the recirculation channel is configured such that induced circulation and centrifugal forces purge air from the bearing fluid through the capillary seal.

* * * * *